United States Patent
Chan et al.

(10) Patent No.: US 8,519,556 B1
(45) Date of Patent: Aug. 27, 2013

(54) METHOD AND APPARATUS FOR STORING ENERGY

(71) Applicant: Elwha LLC, Bellevue, WA (US)

(72) Inventors: Alistair K. Chan, Bainbridge Island, WA (US); Geoffrey F Deane, Bellevue, WA (US); Aaron Fyke, Pasadena, CA (US); William Gross, Pasadena, CA (US); Roderick A. Hyde, Redmond, WA (US); Edward K. Y. Jung, Bellevue, WA (US); Jordin T. Kare, Seattle, WA (US); Nathan P. Myhrvold, Medina, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/663,701

(22) Filed: Oct. 30, 2012

Related U.S. Application Data

(63) Continuation of application No. 13/366,774, filed on Feb. 6, 2012.

(51) Int. Cl.
  *F03G 7/08* (2006.01)
(52) U.S. Cl.
  USPC ............................................. 290/1 R
(58) Field of Classification Search
  USPC ............................................. 290/1 R
  See application file for complete search history.

(56) References Cited

U.S. PATENT DOCUMENTS

| | | | |
|---|---|---|---|
| 2,132,044 A | 10/1938 | Overacker | |
| 2,241,831 A | 5/1941 | Wahlquist | |
| 4,904,996 A | 2/1990 | Fernandes | |
| 5,567,994 A | 10/1996 | Davis et al. | |
| 5,655,617 A | 8/1997 | Marshall | |
| 6,215,316 B1 | 4/2001 | Xu | |
| 6,612,402 B1 | 9/2003 | Illingworth | |
| 6,873,235 B2 | 3/2005 | Fiske et al. | |
| 7,205,732 B1 | 4/2007 | Gold | |
| 7,692,331 B2 | 4/2010 | Langlois et al. | |
| 7,700,880 B2 | 4/2010 | Varkey et al. | |
| 2005/0007340 A1 | 1/2005 | Kobayashi et al. | |
| 2008/0129122 A1 | 6/2008 | Yu et al. | |
| 2008/0164701 A1 | 7/2008 | Brown et al. | |
| 2008/0164702 A1 | 7/2008 | Brown et al. | |
| 2008/0211315 A1 | 9/2008 | Lowenstein | |
| 2008/0305386 A1 | 12/2008 | Havel et al. | |
| 2009/0015022 A1 | 1/2009 | Rome et al. | |
| 2009/0193808 A1 | 8/2009 | Fiske | |

(Continued)

OTHER PUBLICATIONS

McElligott, "Flywheels Set to Help Regulate Frequency on the U.S. Grid", TechSurveillance Magazine, Nov. 20, 2010 (7 pages).

(Continued)

*Primary Examiner* — Tho D Ta
(74) *Attorney, Agent, or Firm* — Foley & Lardner LLP

(57) ABSTRACT

An energy storage apparatus for storing energy transmitted by a power transmission line includes an elastically deformable component and an actuator-generator. The actuator-generator is coupled to the elastically deformable component such that electrical actuation of the actuator-generator generates tension in the elastically deformable component. The actuator-generator is further coupled to the elastically deformable component such that mechanical actuation of the actuator-generator via a release of tension in the elastically deformable component causes a generation of electrical energy by the actuator-generator.

40 Claims, 6 Drawing Sheets

(56) References Cited

U.S. PATENT DOCUMENTS

| | | |
|---|---|---|
| 2010/0005907 A1 | 1/2010 | Kato et al. |
| 2010/0109473 A1 | 5/2010 | Peterson |
| 2010/0117375 A1 | 5/2010 | Kwok |
| 2010/0218495 A1 | 9/2010 | Cowan |
| 2010/0237629 A1 | 9/2010 | Gray |
| 2011/0003656 A1 | 1/2011 | Bennett et al. |
| 2011/0007862 A1* | 1/2011 | Schmidt et al. ............... 290/1 R |
| 2011/0127777 A1 | 6/2011 | Fielder |
| 2011/0148202 A1 | 6/2011 | Rada et al. |
| 2011/0175371 A1 | 7/2011 | Gray |
| 2011/0234256 A1 | 9/2011 | Fuse |
| 2011/0285147 A1 | 11/2011 | Fyke et al. |
| 2011/0296823 A1 | 12/2011 | McBride et al. |
| 2011/0304239 A1 | 12/2011 | Eichhorm et al. |

OTHER PUBLICATIONS

PCT International Search Report; International App. No. PCT/US2013/024756; Apr. 11, 2013; pp. 1-2.

PCT Application Search History; International App. No. PCT/US2013/024756; Search History: Limited Classification Search; date of search Mar. 18, 2013; 13 pages.

PCT International Search Report; International App.: PCT/US13/24863; May 20, 2013; pp. 1-2.

PCT International Search Report; Application No. PCT/US 13/24750; May 6, 2013; pp. 1-2.

* cited by examiner

METHOD AND APPARATUS FOR STORING ENERGY

CROSS REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/366,774, entitled METHOD AND APPARATUS FOR STORING ENERGY, naming Alistair K. Chan, Geoffrey F. Deane, Aaron Fyke, William Gross, Roderick A. Hyde, Edward K. Y. Jung, Jordin T. Kare, Nathan P. Myhrvold, Clarence T. Tegreene, Lowell L. Wood, Jr. as inventors, filed 6 Feb. 2012, which is currently co-pending.

This application is related to U.S. application Ser. No. 13/367,195, titled "Method and Apparatus for Removal of Harmonic Noise," filed Feb. 6, 2012, which is incorporated herein by reference in its entirety.

BACKGROUND

Power on an electric grid for a particular region is generally produced via a plurality of distinct sources at a plurality of locations. The total demand for power by the collective end users on a grid varies temporally at a rate unmatched by the rate at which power production sources respond. Specifically, the rates of changes in power production are typically too slow to precisely match electricity demand increases and decreases. While systems may be implemented to watch demand and to alter, curtail, or increase production in response to the changes in demand, the inequality in the rate changes between demand and production generally cause fluctuations in the frequency of the grid power.

Frequency of the grid power varies at least temporarily as load and generation change. These variations tend to be in sub-hertz (i.e. 0.5 Hz) range on systems operating at 60 Hz or 50 Hz. More specifically, an overload in demand on the system typically causes the overall system frequency to decrease, and a significant reduction in demand typically causes the overall system frequency to increase.

The slow response time in responding to fluctuations in supply and demand on an electrical grid leads to system inefficiencies, wasted power, and dirty electricity (electricity at frequencies other than the primary frequencies).

SUMMARY

The inventors have appreciated that energy storage means, particularly through means capable of rapid energy generation and release, provide advantageous structures for regulating and managing electrical energy and the generation and use thereof. In view of the foregoing, the present disclosure is directed to methods and apparatuses for energy storage.

In one embodiment, an energy storage apparatus for storing energy transmitted by a power transmission line includes an elastically deformable component and an actuator-generator coupled to the elastically deformable component. The actuator generator is configured for coupling to the power transmission line. The actuator-generator may be coupled to the elastically deformable component, such that electrical actuation of the actuator-generator generates tension in the elastically deformable component. The actuator-generator may also be coupled to the elastically deformable component, such that mechanical actuation of the actuator-generator, via a release of tension in the elastically deformable component, causes a generation of electrical energy by the actuator-generator.

In some embodiments, the energy storage apparatus may include a controller coupled to the actuator-generator. The controller may be configured to modulate electrical energy consumption and generation of the actuator-generator. The controller may further be configured to modulate electrical energy consumption and generation at rates greater than or equal to 10 Hz, 1 Hz, or the primary frequency of the power transmission line.

In some embodiments, the actuator-generator of the energy storage apparatus may include at least one of an electrohydraulic component, an electromechanical component, an electromagnetic component, or an electro-fluidic. The actuator-generator may include a piezoelectric component in some embodiments.

The energy storage apparatus may include an electrical power source coupled to the actuator-generator, which power source may include a power transmission line.

The elastically deformable component of the energy storage apparatus may include a cable. The actuator-generator may be coupled to at least one end of the cable. In some embodiments, the actuator-generator may be coupled to the cable at a point on the cable disposed between a first end of the cable and a second end of the cable. The cable may be a non-rotating cable, a monolithic cable, a stranded cable, a straight stranded cable, or a twisted stranded cable. The cable may have a circular cross-section, a rectangular cross-section, or a ribbon-like cross section. The cable may be a hanging cable which may include weights coupled thereto in accordance with some embodiments. The cable may be pre-tensioned, for example, via weights in accordance with various inventive embodiments. The cable may be configured in a linear orientation and may be configured in a plurality of folds via a plurality of bearings. The cable may be composed of steel, an organic polymer, a synthetic polymer such as Kevlar, or Zylon, of a carbon fiber, such as carbon nanotubes.

In some embodiments, the actuator-generator may be coupled to the elastically deformable component, such that electrical actuation of the actuator generator generates torsional tension in the elastically deformable component. In other embodiments, the actuator-generator may be coupled to the elastically deformable component, such that electrical actuation of the actuator-generator generates linear tension in the elastically deformable component.

In some embodiments, the energy storage apparatus may include a housing in which at least a portion of the elastically deformable component and the actuator-generator are disposed.

In some embodiments, the actuator-generator includes a rotary motor, and in some embodiments, the actuator-generator includes a linear motor.

The actuator-generator may be configured to maintain the tension generated in the elastically deformable component in some embodiments. The actuator-generator may include at least one of a brake, a releasable ratchet, or a movable pin actuatable to maintain the tension generated in the elastically deformable component.

The energy storage apparatus may include at least one sensor coupled to the elastically deformable component or the actuator-generator. The sensor may be configured to measure the tension in the elastically deformable component, which tension may include linear strain or shear strain. The sensor may be configured to measure force or torque applied by the actuator-generator, or may be configured to measure stress in the elastically deformable component. The energy storage apparatus may include a strain gauge coupled to the elastically deformable component for measuring the strain in the elastically deformable component. The energy storage apparatus may include at least one sensor coupled to at least one of the elastically deformable component or the actuator-generator, which sensor may be configured to measure an energy storage quantity or an energy efficiency of the energy storage apparatus.

In some embodiments, the actuator-generator of the energy storage apparatus may be coupled to the elastically deformable component, such that electrically actuating the actuator-generator causes an application of a transverse force to the elastically deformable component.

In some embodiments, the energy storage apparatus may be coupled to a power-sink and the power sink may be the power transmission line.

Other exemplary inventive embodiments disclosed herein provide an energy storage apparatus for storing energy transmitted by a power transmission line. The energy storage apparatus includes an elastically deformable component coupled to an actuator and a generator. The actuator is configured for coupling to the power transmission line. The actuator may be coupled to the elastically deformable component, such that electrically actuating the actuator generates tension in the elastically deformable component. The generator may be coupled to the elastically deformable member such that mechanical actuation of the actuator generator via a release of tension in the elastically deformable component causes a generation of electrical energy by the generator.

Other exemplary inventive embodiments disclosed herein provide an energy storage apparatus that includes an elastically deformable component coupled to a power transducer. The power transducer is configured for coupling to a power transmission line. The power transducer may be configured to generate, from electrical energy received from a power source, elastic energy in the elastically deformable component by tensile deformation of the elastically deformable component. The power transducer may also be configured to generate electrical energy, from elastic energy received from the elastically deformable component.

Some exemplary inventive embodiments disclosed herein provide a method for storing energy. The method, according to some embodiments, includes generating tension in an elastically deformable component via an electrically actuatable motor. The tension is generated by the motor during a temporal period of electrical actuation of the motor. The method further includes actuating an electrical generator coupled to the elastically deformable component via restoring force produced by the elastically deformable component during a release of at least a part of the tension generated in the elastically deformable component, thereby generating electrical energy.

In another exemplary inventive embodiment, a method of maintaining a power transmission line at a specified electrical frequency is provided. The method of maintaining a power transmission line at a specified electrical frequency includes measuring an electrical frequency of the power transmission line and adjusting the electrical frequency of the power transmission line such that the electrical frequency is substantially equal to the specified electrical frequency. The electrical frequency may be adjusted by at least one of removing electricity from the power transmission line or adding electricity to the power transmission line. Removing electricity from the power transmission line includes comprises transmitting electricity from the power transmission line to an electrically actuatable motor and thereby actuating the motor to generate tension in an elastically deformable component. Adding electricity to the power transmission line includes generating, with a generator coupled to the elastically deformable component, electricity via actuation of the generator by a restoring force produced by the elastically deformable component during a release of at least a part of the tension generated in the elastically deformable component.

The method of maintaining a power transmission line at a specified electrical frequency may also include removing, via a filter, electricity at a frequency distinct from the specified electrical frequency from the power transmission line and transmitting the electricity at a frequency distinct from the specified electrical frequency to the motor to generate tension in the elastically deformable component.

Exemplary inventive embodiments also provide a computer program product. The computer program product includes computer readable code stored on a tangible storage medium. The computer readable code forms a computer program executable by a computer for maintaining an electrical output of a power transmission line at a specified electrical frequency. The computer program includes computer code for causing a sensor to measure the electrical frequency of the power transmission line and computer code for adjusting the electrical frequency of the power transmission line such that the electrical frequency is substantially equal to the specified electrical frequency by at least one of removing electricity from the power transmission line or adding electricity to the power transmission line. Removing electricity from the power transmission line based on the computer code includes causing transmission of electricity from the power transmission line to an electrically actuatable motor and thereby actuating the motor to generate tension in an elastically deformable component. Adding electricity to the power transmission line based on the computer code includes causing generation, via a generator coupled to the elastically deformable component, of electricity via actuation of the generator by a restoring force produced by the elastically deformable component during a release of at least a part of the tension generated in the elastically deformable component and causing transmission of the generating electricity to the power transmission line.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE FIGURES

The skilled artisan will understand that the drawings primarily are for illustrative purposes and are not intended to limit the scope of the inventive subject matter described herein.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive apparatuses, methods, and systems for storing energy. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various exemplary embodiments are directed generally to apparatuses methods for storing energy and optionally using stored energy to generate electricity. Various embodiments are particularly directed towards the conversion of electrical energy into mechanical energy, the use of the mechanical energy to generate potential energy which may be temporally stored, and the harvesting of electrical energy from stored potential energy. The concepts disclosed herein may have substantial utility in the context of power regulation and rapid responses in connection with fluctuating energy demands.

Figure 1:
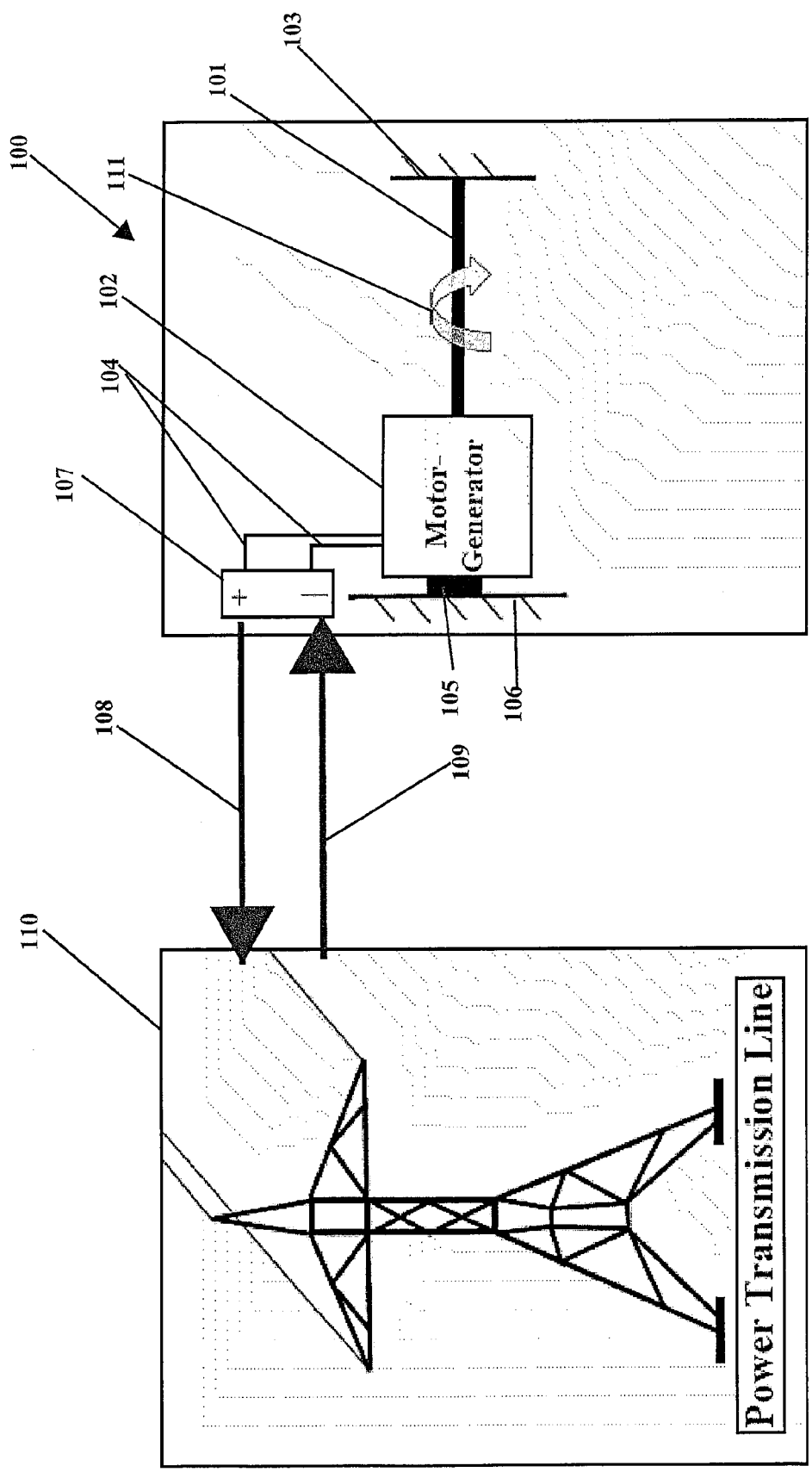
FIG. 1 illustrates an energy storage and generation apparatus connected to a power source, in accordance with an exemplary embodiment.

FIG. 1 illustrates an energy storage and generation apparatus connected to a power source, according to one embodiment. In the embodiment depicted in FIG. 1, the energy storage and generation apparatus 100 includes an elastically deformable component 101. Elastically deformable component 101 may be composed of a cable. The elastically deformable member is coupled to an actuator in the form of a combined motor-generator 102 in the depicted embodiment. Motor-generator 102 is a rotary actuator in the illustrated exemplary embodiment. In accordance with various inventive embodiments, elastically deformable member 101 may be coupled to a distinct motor or actuator and a distinct generator. Motor-generator 102 is coupled to component 101 for rotatably applying a force to generation torsional tension (referenced by actuation direction 111) to component 101. Motor-generator is coupled to an extremity of component 101 in the illustrated embodiment. The extremity of component 101 opposing the extremity coupled to motor-actuator 102 is coupled to a stationary structure to assist in the twisting of the component 101 upon actuation of the end coupled to the motor-generator. As such, upon rotary actuation of the motor-generator 102, component 101 is twisted and in opposition to a return force wanted to return the component to its untwisted configuration. The motor-generator is anchored via base 105 to a stationary structure 106 to maintain the motor in a stationary orientation when torsional tension is generated in component 101. Structure 106 may support component to prevent a force, torque or moment applied to the component from causing a complete rotation of the component.

Motor-generator 102 is actuated via electrical energy transmitted from a power transmission line 110. In some embodiments, energy storage and generation apparatus 100 may be disposed in a housing coupled directly to a utility pole carrying the power transmission line and may be directly or indirectly coupled to the power transmission line. In embodiments where the motor-generator is indirectly coupled to the power transmission line, intermediate components such as transformers or rectifiers may be disposed between the power transmission line 110 and the motor-generator 102.

Motor-generator 102 may be actuated for power regulation, for example when more power is being produced than is required. Particularly in response to a decrease in demand or an increase in capacity, certain embodiments disclosed herein may be utilized a mechanism for temporarily storing a portion of the excess energy through consumption by the motor-generator for elastically stretching component 101. Upon an increase in demand and a decrease in capacity, the stored energy may be rapidly released to provide a quick substitute for the energy generation capacity.

Motor-generator 102 generally includes two primary components, a rotor and a stator. Either the rotor or the stator may constitute the armature or the magnetic field. The magnetic field is generally created via field coils, which may be powered via a portion of the electricity from the power transmission line. The electrically generated magnetic field may constitute an electro-mechanical component and electricity from the power transmission line may provide the electric current used to create the magnetic field. The motor portion of the motor-generator may comprise an AC or a DC motor, including, but not limited to, multiphase, asynchronous and synchronous AC motors. In some embodiments, the motor includes a brake component to hold the twisted component 101 in the strained configuration. The brake may directly constrain the rotor of the motor in various embodiments. In other embodiments, as disclosed further herein, the brake may constrain component 101 and may be include a system that is integral or separate from the motor-generator 102 and component 101. Although motor-generator 102 is illustrated in FIG. 1 as a combined motor and generator various inventive embodiments may include a separate and distinct motor and generator and may include a plurality of motors or actuators and a plurality of generators, which may be coupled to one or more elastically deformable components.

Component 101 may be held in the twisted configuration for the required timeframe and released upon command. The control of the motor-generator 102, including actuation and release, may be controlled via a controller. The controller may be a local controller or may include a remotely controlled system. At the appropriate command, the twisted component 101 may be released. The restoring force exerted by the release of the twisted component may be used to mechanically move the rotor of the motor-generator, such that motion of the magnetic field induces an electrical current to flow in the coils previously powered by power transmission line. The current induced by the mechanical motion of the rotor may be directed back towards the power transmission line and thereby inserted back into the electrical grid. In various embodiments, a capacitor may be included to store energy that is in excess of what the tension in the wire may elastically hold. For example, this approach may be used if the power required to be shed from the grid to maintain the power transmission line operating at the right power level and frequency exceeds that storable by tension in component 102. At least a portion of the tension may be released to charge the capacitor and the excess energy from the grid may be used to recharge and re-apply tension generating force to component 102. The tension in the cable may be monitored, for example via a strain gauge or other sensor, for determining when the capacity of the elastically deformable component has been reached. Such a schematic for sharing power between a device such as a capacitor and the elastically deformable component 102, affords increased overall capacity of system 100. In some embodiments, power generated by the restoring force of tensioned component may be used to magnetize the field magnets. Power input into motor-generator 102 and power output from motor-generator 102 may be facilitated via connections 104, which may link to a central connection interface 107 coupled to power transmission line 110. As mentioned, electrical energy 109 may be transmitted to apparatus 100 from the power transmission line 110 and electrical energy 108 may be transmitted to the power transmission line 110 from apparatus 100.

A control system may be provided for controlling the consumption and generation of electrical energy by apparatus 100. The control system may be connected to a sensor for monitoring the frequency of the power transmitted in the power transmission line 110. The information received from the sensor may be used to initiate, increase, or decrease energy consumption as needed to maintain the power transmission line at a specific frequency. The control system may implement a computer program, which may be configured to control operation of a plurality of energy storage and generation apparatuses.

Figure 2:
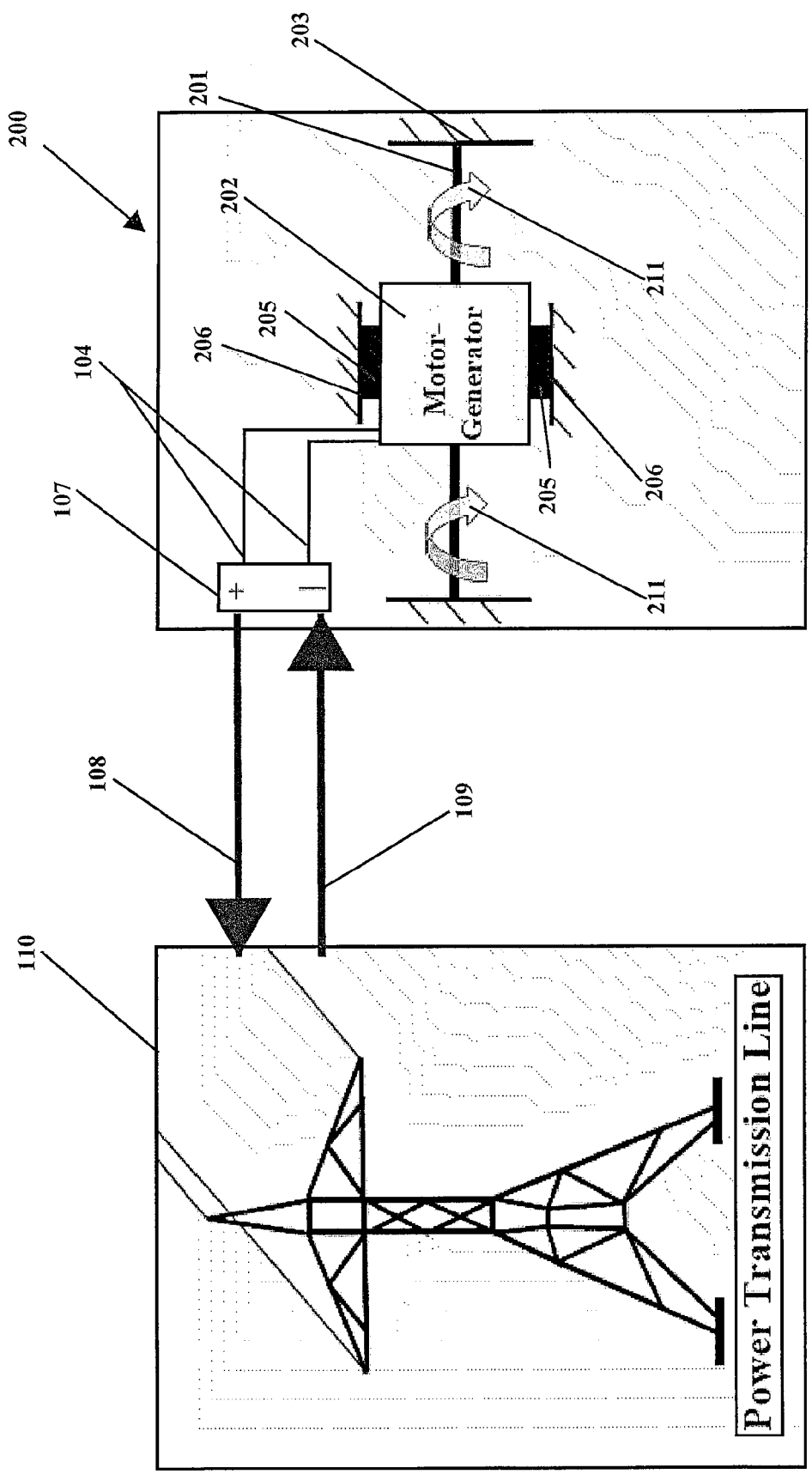
FIG. 2 illustrates an energy storage and generation apparatus connected to a power source, in accordance with another embodiment.

FIG. 2 illustrates an energy storage and generation apparatus connected to a power source, according to another exemplary embodiment. The energy storage and generation apparatus 200 depicted in FIG. 2, in a manner similar to the embodiment of FIG. 1, operates through rotary actuation, as indicated by arrows 211, along an axis of elastically deformable component 201. In various embodiments, rotary actuation may be about a longitudinal axis, and in some embodiments, rotary actuation may be about an axis having a vertical component. However, as shown in FIG. 2, motor-generator 202 is coupled to elastically deformable component 201, which may be a cable component, at an intermediate location on component 201 disposed between two opposing extremities of component 201. Accordingly, in this embodiment component 201 is coupled to both axial ends of the rotor of motor generator 202. Motor-generator 202 remains anchored via base components 205 to a stationary structure 206.

Figure 3:
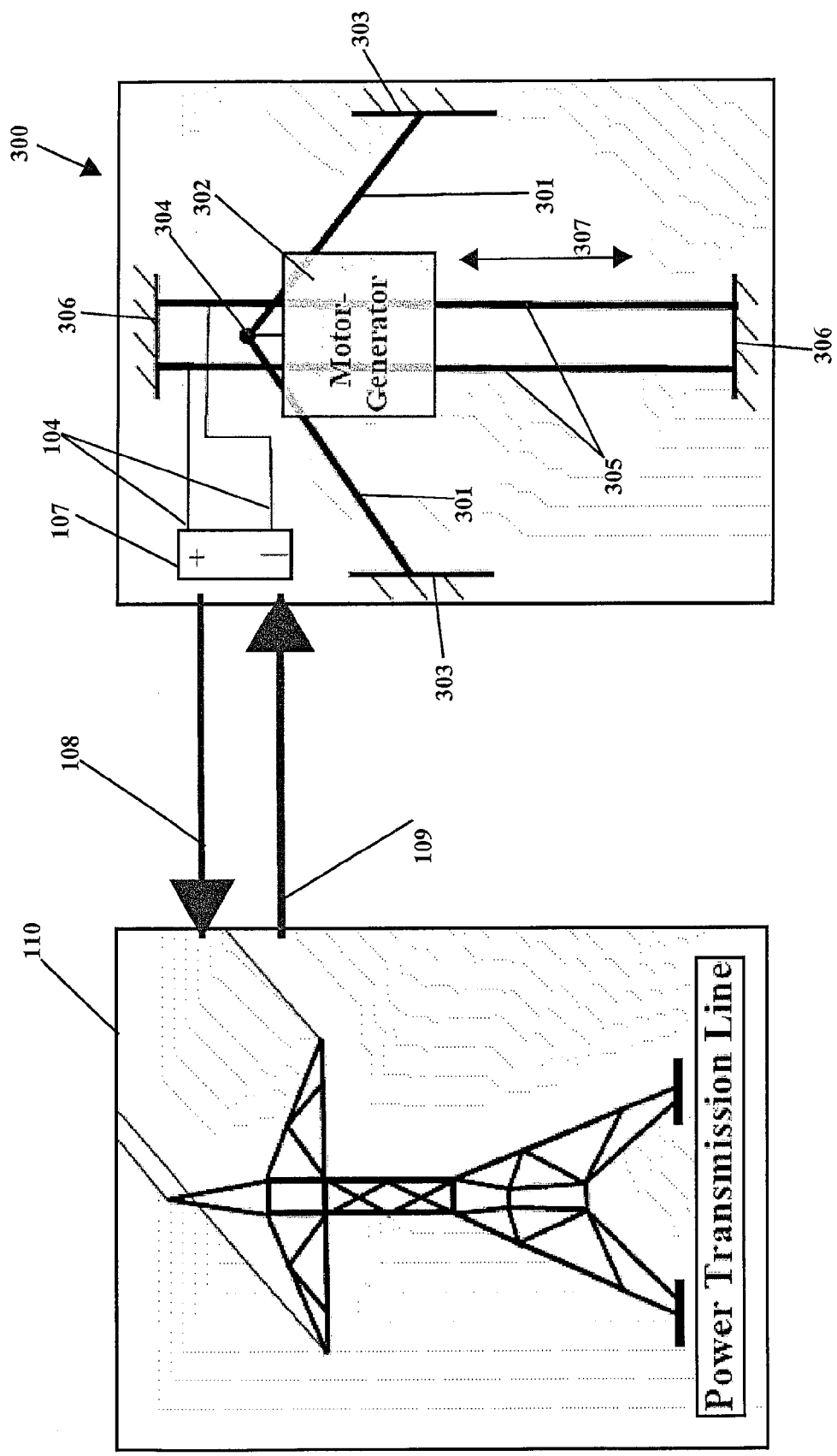
FIG. 3 shows an energy storage and generation apparatus having a linear actuator configured to translate in a direction transverse to the axis of an energy storage component, in accordance with one embodiment.

FIG. 3 shows an energy storage and generation apparatus having a linear actuator configured to translate in a direction transverse or substantially perpendicular to the axis of an energy storage component, according to another exemplary embodiment. Motor-generator 302, which may simply include a motor in some embodiments having a separate generator, actuates linearly. Some inventive embodiments may include a plurality of motors and generators. As demonstrated in FIG. 3, linearly actuating motor 302 via electrical energy transmitted from power transmission line 110 causes the motor (or at least a portion thereof), to move in a direction that traverses the axis of elastically deformable component 301, as indicated by arrow 307. Because component 301 is coupled to motor-generator 302 via coupler 304, which may permit rotation, as motor 302 is actuated component 301 is stretched laterally and the tension in component 301 is thereby increased. Accordingly, a restoring force is acting on component 301, which is anchored at anchors 303. The restoring force is proportionate to the lateral displacement of a portion of component 301 from its neutral location. As further demonstrated, motor-generator 302 may be disposed on tracks 305, rigidly coupled to support structures 306. Tracks 305 maintain properly alignment of motor generator 302. Furthermore, because of the linear and possibly reciprocating motion that may be exerted on motor-generator 302, tracks 305 may include coils within which electrical current may be induced for the generation of electricity as a magnetic field in motor-generator 302 passes the coils via the exertion from the restoring force of stretched component 301. The input current for electrically actuating motor-generator 302 to displace the motor-generator and tension component 301 may be input through coils in tracks 305. Inputting and inducing current into coils 305 may be advantageous over inputting current into motor-generator and creating a magnetic field at tracks 305 in some implementations as this allows the primary coils and hence the wires connected thereto to remain stationary.

Figure 4:
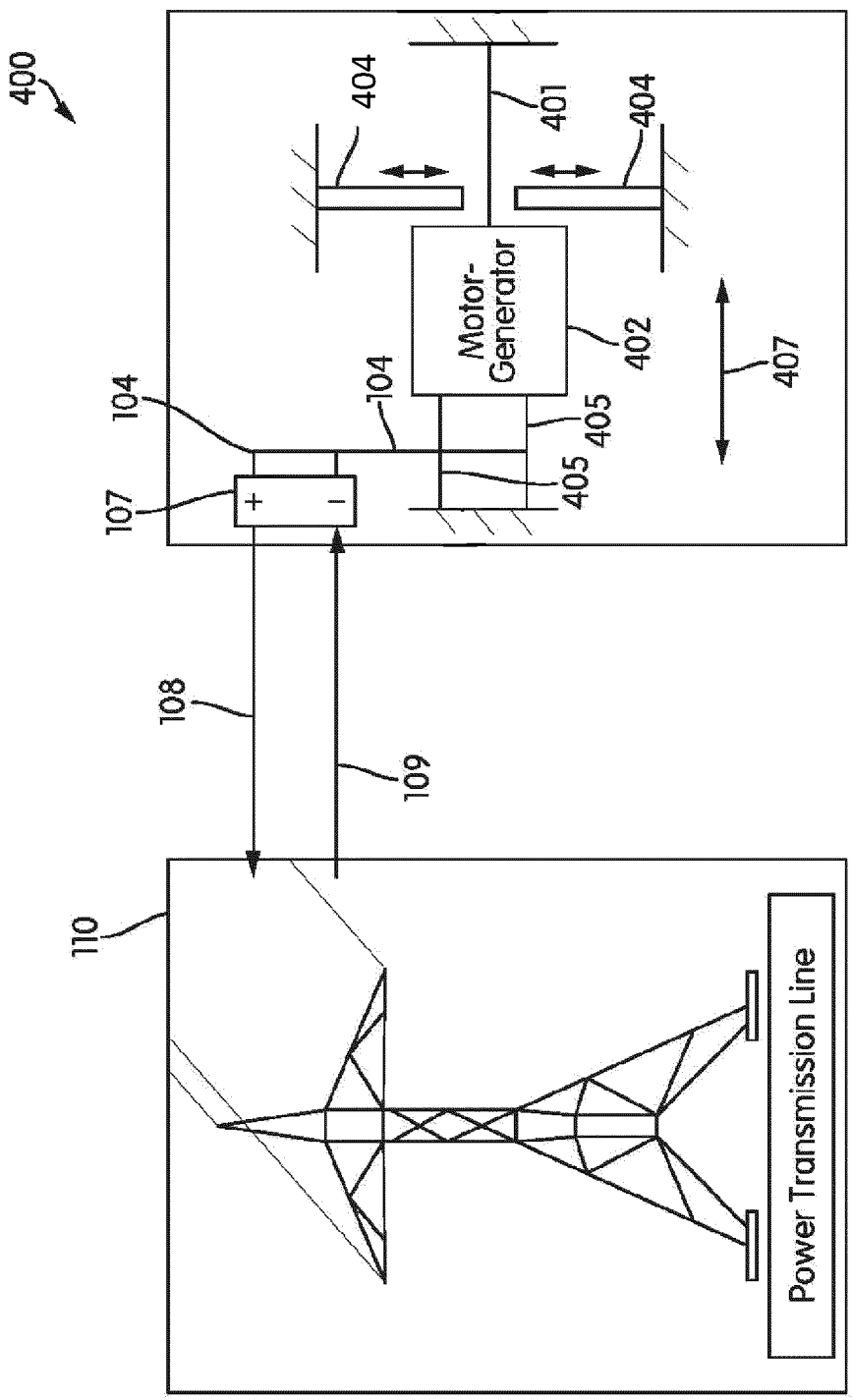
FIG. 4 shows an energy storage and generation apparatus having a linear actuator configured to translate along the axis of an energy storage component, in accordance with one embodiment.

FIG. 4 shows an energy storage and generation apparatus having a linear actuator configured to translate along the axis of an energy storage component according to another exemplary embodiment. Motor-generator 402 of apparatus 400, which may simply include a motor in some embodiments having a separate generator, also actuates linearly. However, in contrast to the embodiment demonstrated in FIG. 3, the embodiment shown in FIG. 4, when linearly actuated via electrical energy transmitted from power transmission line 110, causes the motor (or at least a portion thereof) to move in a direction along or parallel to the axis of elastically deformable component 401 as indicated by arrow 407. FIG. 4 further demonstrates independent braking components 404. Brake 404 may be actuated to exert inward and oppositely opposed forces on component 401. This clamping force may be applied after extension to maintain the potential energy in stretched component 401, without requiring the motor and bearing components therein to sustain high axial forces applied by the restoring force of the tensioned component 401 on the motor or bearing contained therein. As described in connection with FIG. 3, motor-generator 402 may be disposed on one or more tracks 405, which tracks may include coils within which electrical current may be induced for the generation of electricity as a magnetic field in motor-generator 402 passes the coils via the exertion from the restoring force of stretched component 401. The input current for electrically actuating motor-generator 402 to displace the motor-generator and tension component 401 may be input through coils in tracks 405.

Figure 5:
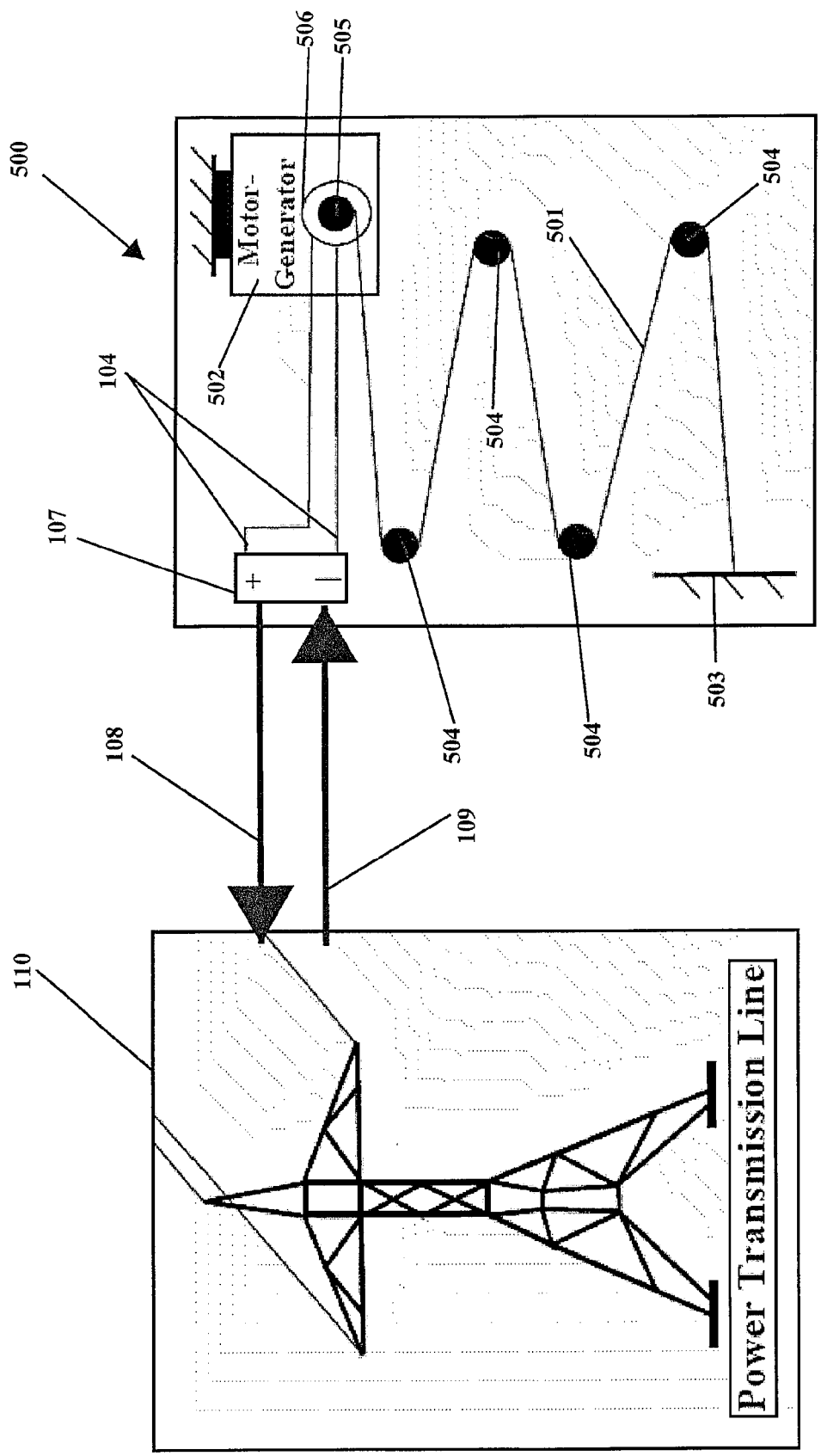
FIG. 5 depicts an energy storage and generation apparatus actuating a folded or undulated energy storage component, in accordance with one embodiment.

FIG. 5 depicts an energy storage and generation apparatus actuating a folded or undulated energy storage component according to another exemplary embodiment. Energy storage and generation apparatus 500 uses rotary motion for application of force generating linear tension and conversely uses linear tension to generate electricity through rotating mechanical actuation. Motor-generator 502 includes a rotary motor and a rotary generator. Electrical actuation of the rotor of rotor-generator 502 causes application of linear tension to elastically deformable component 501. Stretching of component 501 is accommodated via bearings 504, which may rotate as component 501 is stretched or which may be composed of a low friction material that affords sliding of component 501 around the bearings. The component is attached to structure 503 to permit linear stretching. Once the tension in component 501 is released, it causes rotor 505 of motor-generator 502 to rotate in the opposite direction that it was actuated in to stretch the pulley. This rotation of the rotor 505, which may comprise the magnetic field, may be used to induce a current to flow in coils 506 surrounding the magnetized rotor, thereby produces electricity for transmission to the power transmission line 110 as required.

As described above, elastically deformable components provided herein may include a cable, which cable may be a non-rotating cable, a monolithic cable, a stranded cable, a straight stranded cable, or a twisted stranded cable. The cable may have a circular cross-section, a rectangular cross-section, or a ribbon-like cross section. The cable may be a hanging cable in accordance with some embodiments and may be pre-tensioned, for example, via weights. The cable may be composed of steel in some embodiments. The cable may be composed of steel, an organic polymer, a synthetic polymer such as Kevlar (poly-paraphenylene terephthalamide), or Zylon (poly-phenylene benzobisoxazole), of a carbon fiber, such as carbon nanotubes.

A variety of braking mechanisms may be used to retain the tension in the cable. In addition to the clamping mechanism described above in connection with FIG. 4, braking may be achieved via an actuatable pin, which pin may lock the motor-generator or may be engageable with the cable for locking, or a ratchet mechanism preventing back-rotation unless disengaged.

In various embodiments, the motor-generator may include or be comprised of an actuator or power transducer in the form of an electro-hydraulic actuator, an electro-magnetic actuator, an electro-fluidic actuator or another type of electromechanical actuator, such as a piezo-electric motor.

In various inventive embodiments, the energy storage apparatus may include at least one sensor coupled to at least one of the elastically deformable component or the actuator-generator, which sensor may be configured to measure an energy storage quantity or an energy efficiency of the energy storage apparatus. The energy storage quantity may quantify the strain energy stored, the energy input for generating tension, or the energy recovered from the system. The energy storage quantity may measure the cumulative stored energy, which may be the cumulative energy added to the energy storage apparatus or the cumulative energy returned to a power transmission line by an energy storage apparatus. This cumulative energy quantity may be used as a pricing metric to determine how much energy storage a user or a consumer may be charged for. Similarly, the energy efficiency may measure the cumulative stored energy which may quantify the energy input relative to the energy recovered or generated by the system. The energy storage quantity may provide a metric used to determine an amount charged to a consumer using energy stored and or generated by an inventive embodiment provided herein.

Figure 6:
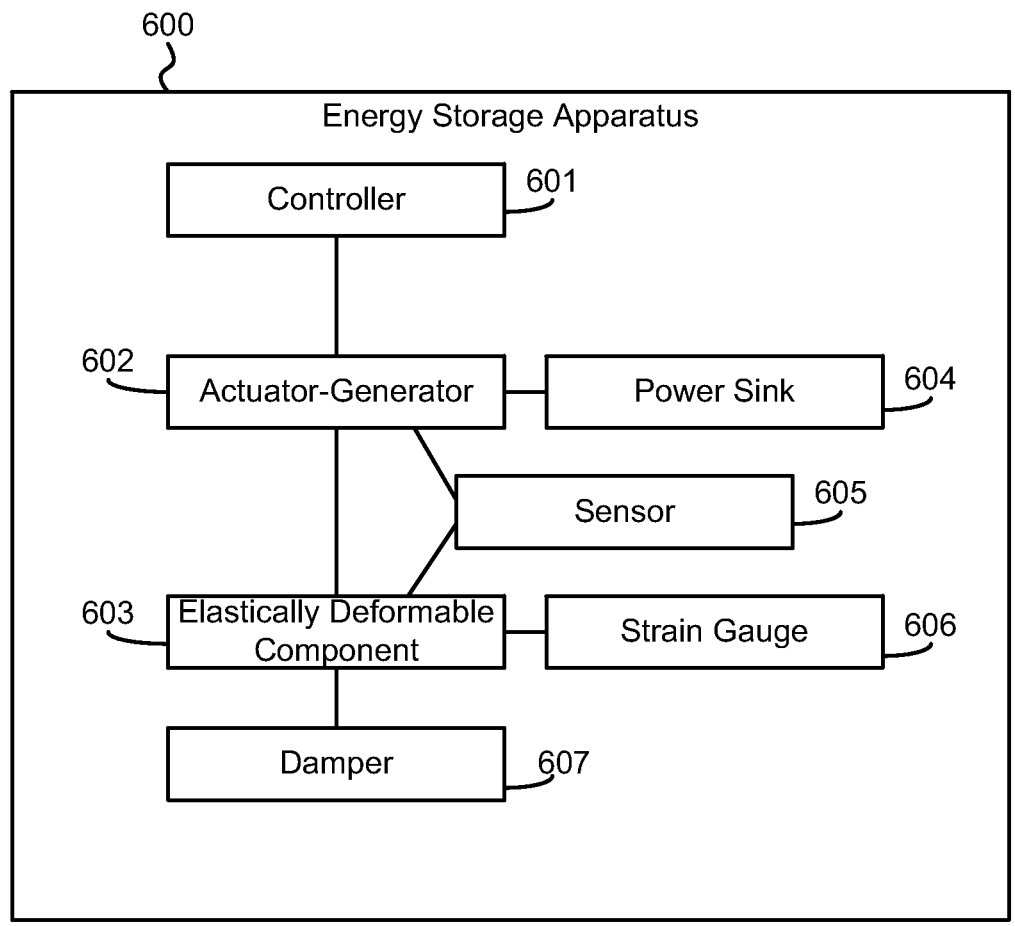
FIG. 6 illustrates an energy storage apparatus for storing energy transmitted by a power line, in accordance with an exemplary embodiment.

Referring to FIG. 6, an energy storage apparatus 600 for storing energy transmitted by a power transmission line is shown. Energy storage apparatus 600 includes controller 601 coupled to actuator-generator 602. Energy storage apparatus 600 includes elastically deformable component 603 coupled to actuator-generator 602 such that electrical actuation of the actuator-generator generates tension in the elastically deformable component and such that mechanical actuation of the actuator-generator via a release of tension in the elastically deformable component causes a generation of electrical energy by the actuator-generator. Energy storage apparatus 600 includes power sink 604 coupled to actuator-generator 602. Energy storage apparatus 600 includes at least one sensor (shown as sensor 605) coupled to at least one of actuator-generator 602 or elastically deformable component 603. Elastically deformable component 603 may be a cable. Energy storage apparatus 600 includes damper 607 coupled to the cable. Energy storage apparatus 600 includes strain gauge 606 configured to measure strain in the elastically deformable component.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of storing energy transmitted by a power transmission line, the method comprising:
   generating tension in an elastically deformable component via an electrically actuatable motor during a temporal period of electrical actuation of the motor via energy transmitted from the power transmission line; and
   actuating an electrical generator coupled to the elastically deformable component via restoring force produced by the elastically deformable component during a release of at least a part of the tension induced in the elastically deformable component, whereby electrical energy is generated;
   wherein the elastically deformable component is a cable.

2. The method according to claim 1, further comprising transmitting the electrical energy generated to the power transmission line.

3. The method according to claim 1, wherein the electrically actuatable motor and the generator are coupled.

4. The method according to claim 1, wherein the electrically actuatable motor includes a drive shaft coupled to the generator.

5. The method according to claim 1, wherein tension is induced by applying a force to at least one end of the cable.

6. The method according to claim 1, wherein tension is induced by applying a force at a point on the cable disposed between a first end and a second end of the cable.

7. The method according to claim 1, wherein tension is induced by applying a transverse force to the cable.

8. The method according to claim 1, wherein the cable is a non-rotating cable.

9. The method according to claim 1, wherein the cable is a monolithic cable.

10. The method according to claim 1, wherein the cable is a stranded cable.

11. The method according to claim 1, wherein the cable is a straight stranded cable.

12. The method according to claim 1, wherein the cable is a twisted stranded cable.

13. The method according to claim 1, wherein the cable has a circular cross-section.

14. The method according to claim 1, wherein the cable has a rectangular cross-section.

15. The method according to claim 1, wherein the cable has a ribbon-like cross-section.

16. The method according to claim 1, wherein the cable is pre-tensioned.

17. The method according to claim 1, wherein the induced tension is torsional.

18. The method according to claim 1, wherein the induced tension is linear.

19. The method according to claim 1, wherein the motor is a rotary motor.

20. The method according to claim 1, wherein the motor is a linear motor.

21. The method according to claim 1, wherein the motor is actuated via at least one of an electro-hydraulic component, an electromechanical component, an electromagnetic component, or an electro-fluidic component.

22. The method according to claim 1, wherein the motor is actuated via a piezoelectric component.

23. The method according to claim 1, wherein the electrically actuatable motor and the generator are connected to a power transmission line.

24. The method according to claim 1, further comprising regulating, via a controller, electrical energy consumption of the electrically actuatable motor and electrical energy generation of the generator.

25. The method according to claim 1, further comprising measuring, via a sensor coupled to at least one of the elastically deformable component or the actuator generator, the amount of tension applied to the elastically deformable component.

26. The method according to claim 1, further comprising measuring, via a strain gauge, strain in the elastically deformable component.

27. The method according to claim 1, wherein actuating an electrical generator coupled to the elastically deformable component via restoring force produced by the elastically deformable component during a release of at least a part of the tension induced in the elastically deformable component occurs after the generated tension has been maintained in the elastically deformable component over a period of time.

28. The method according to claim 1, further comprising measuring an energy efficiency.

29. The method according to claim 1, wherein the cable is a hanging cable.

30. The method according to claim 29, further comprising weights coupled to the hanging cable.

31. The method according to claim 1, further comprising measuring an energy storage quantity.

32. The method according to claim 1, further comprising charging an energy user based on the measured energy storage quantity.

33. A method of maintaining a power transmission line at a specified electrical frequency, the method comprising:
   measuring an electrical frequency of the power transmission line;
   adjusting the electrical frequency of the power transmission line such that the electrical frequency is substantially equal to the specified electrical frequency by at least one of removing electricity from the power transmission line or adding electricity to the power transmission line; and
   removing electricity from the power transmission line and adding electricity to the power transmission line at rates greater than or equal to 1 Hz;

wherein removing electricity from the power transmission line comprises transmitting electricity from the power transmission line to an electrically actuatable motor and thereby actuating the motor to generate tension in an elastically deformable component and wherein adding electricity to the power transmission line comprises generating, with a generator coupled to the elastically deformable component, electricity via actuation of the generator by a restoring force produced by the elastically deformable component during a release of at least a part of the tension induced in the elastically deformable component.

34. The method of maintaining a power transmission line at a specified electrical frequency according to claim 33, further comprising removing electricity from the power transmission line and adding electricity to the power transmission line at rates greater than or equal to 10 Hz.

35. The method of maintaining an electrical output of a power transmission line at a specified electrical frequency according to claim 33, wherein the electrically actuatable motor and the generator are coupled to one another.

36. The method of maintaining a power transmission line at a specified electrical frequency according to claim 33, wherein the elastically deformable component is a cable.

37. The method of maintaining a power transmission line at a specified electrical frequency according to claim 33, further comprising removing, via a filter, electricity at a frequency distinct from the specified electrical frequency from the power transmission line and transmitting the electricity at a frequency distinct from the specified electrical frequency to the motor to apply tension to the elastically deformable component.

38. A method of storing energy transmitted by a power transmission line, the method comprising:
   generating tension in an elastically deformable component via an electrically actuatable motor during a temporal period of electrical actuation of the motor via energy transmitted from the power transmission line; and
   actuating an electrical generator coupled to the elastically deformable component via restoring force produced by the elastically deformable component during a release of at least a part of the tension induced in the elastically deformable component, whereby electrical energy is generated;
   wherein the induced tension is linear.

39. The method according to claim 38, further comprising regulating, via a controller, electrical energy consumption of the electrically actuatable motor and electrical energy generation of the generator.

40. The method according to claim 38, further comprising measuring, via a sensor coupled to at least one of the elastically deformable component or the actuator generator, the amount of tension applied to the elastically deformable component.

\* \* \* \* \*